United States Patent
Yan et al.

(10) Patent No.: US 9,832,416 B2
(45) Date of Patent: Nov. 28, 2017

(54) DEVICE FOR DEPLOYING AND RETRACTING LIQUID CRYSTAL DISPLAY (LCD) AND CONTROL METHOD THEREOF

(71) Applicant: CETCA AVIONICS CO., LTD., Sichuan (CN)

(72) Inventors: Zhijian Yan, Chengdu (CN); Shuhua Liu, Chengdu (CN); Dake Liao, Chengdu (CN); Hanjun Kou, Chengdu (CN)

(73) Assignee: CETC AVIONICS CO., LTD., Sichuan (CN)

( * ) Notice: Subject to any disclaimer, the term of this patent is extended or adjusted under 35 U.S.C. 154(b) by 273 days.

(21) Appl. No.: 14/651,921

(22) PCT Filed: Dec. 24, 2012

(86) PCT No.: PCT/CN2012/087297
§ 371 (c)(1),
(2) Date: Jun. 12, 2015

(87) PCT Pub. No.: WO2014/089880
PCT Pub. Date: Jun. 19, 2014

(65) Prior Publication Data
US 2015/0319396 A1    Nov. 5, 2015

(30) Foreign Application Priority Data

Dec. 12, 2012  (CN) .......................... 2012 1 0535472

(51) Int. Cl.
*H04N 5/655* (2006.01)
*G02F 1/1333* (2006.01)
(Continued)

(52) U.S. Cl.
CPC ......... *H04N 5/655* (2013.01); *B60R 11/0235* (2013.01); *B64D 11/0015* (2013.01);
(Continued)

(58) Field of Classification Search
CPC ...................................................... H04N 5/655
(Continued)

(56) References Cited

U.S. PATENT DOCUMENTS 5,847,685 A * 12/1998 Otsuki .................. B60K 35/00
                                                                     248/920
6,256,078 B1    7/2001 Ogata
(Continued)

FOREIGN PATENT DOCUMENTS

| CN | 2618260 Y | 5/2004 |
| CN | 201173277 Y | 12/2008 |
| EP | 1898384 A1 | 3/2008 |

OTHER PUBLICATIONS

Sep. 19, 2013 International Search Report issued in International Application No. PCT/CN2012/087297.
(Continued)

*Primary Examiner* — David S Luo
(74) *Attorney, Agent, or Firm* — Oliff PLC

(57) ABSTRACT

The servomechanism comprises a gear motor, a one-way bearing dynamically connected to the gear motor, an electromagnetic clutch, a speed reducer, and a plane four-bar linkage mechanism which drives the LCD on the shafts to rotate. The electromagnetic clutch is also connected to a spring motor which dynamically connects to the speed reducer. In the deploying and retracing direction of the LCD, a stowed position transducer and a retracted position transducer are disposed to monitor the LCD position changes and an angle sensor to monitor the LCD deploying speed changes. The stowed position transducer, retracted position transducer, and angle sensor are electrically connected to a controller. The controller collects and processes signals generated by the stowed position transducer, retracted posi-
(Continued)

tion transducer, and angle sensor and controls LCD retracting in the event of power outage or unexpected exceptions.

15 Claims, 3 Drawing Sheets

(51) Int. Cl.
- *H04N 5/645* (2006.01)
- *H04N 5/63* (2006.01)
- *H04N 21/414* (2011.01)
- *B60R 11/02* (2006.01)
- *F16M 11/10* (2006.01)
- *F16M 11/18* (2006.01)
- *F16M 13/02* (2006.01)
- *B64D 11/00* (2006.01)
- *B60R 11/00* (2006.01)

(52) U.S. Cl.
CPC ............ *F16M 11/10* (2013.01); *F16M 11/18* (2013.01); *F16M 13/027* (2013.01); *G02F 1/133308* (2013.01); *H04N 5/63* (2013.01); *H04N 5/645* (2013.01); *H04N 21/41422* (2013.01); *B60R 2011/0082* (2013.01); *B60R 2011/0085* (2013.01); *B60R 2011/0092* (2013.01)

(58) Field of Classification Search
USPC ....................................... 318/3, 34
See application file for complete search history.

(56) References Cited

U.S. PATENT DOCUMENTS

| 7,405,773 | B2* | 7/2008 | Lester ................. B60R 11/0235 |
| | | | 348/825 |
| 7,744,460 | B2* | 6/2010 | Walker ................. G07F 17/3213 |
| | | | 463/16 |
| 2004/0075639 | A1 | 4/2004 | Lester et al. |

OTHER PUBLICATIONS

Apr. 16, 2014 Office Action issued in Chinese Application No. 201210535472.8.
Sep. 19, 2013 Written Opinion issued in International Application No. PCT/CN2012/087297.
Oct. 18, 2016 Extended Search Report issued in European Patent Application No. 12889964.8.

* cited by examiner

DEVICE FOR DEPLOYING AND RETRACTING LIQUID CRYSTAL DISPLAY (LCD) AND CONTROL METHOD THEREOF

FIELD OF THE INVENTION

The present invention relates to a device for deploying and retracting liquid crystal display (LCD) and Control Method Thereof. The device can be used for video play of the entertainment system in aircraft cabins, high-speed railway locomotives, vehicles, ships, and public buildings.

BACKGROUND ART

Video players used on aircrafts, railways, vehicles, and ships require that the LCD can be stowed at a specified angle when it is working to entertain the passengers and be retracted when it is idle to save space and protect the LCD and passengers from accidental collisions. Such requirements are even more strict for aircraft cabin entertainment system which requires the video player deploying and retracting device to be energy-efficient and that the LCD can be timely retracted in the event of power outage and be automatically retracted when the LCD encounters an external force when it is deploying or playing video files.

However, video players currently available are still far from fully providing the aforesaid functions and most of them realize deploying and retracting through energization or deenergization or by using a simple physical construction. Retracting of video players in the event of power outage or unexpected exceptions is still not feasible, leaving potential safety loopholes. Meanwhile, the existing video players are of a complicated structure and routine maintenance is rare.

DISCLOSURE OF THE INVENTION

Technical Problems

To overcome the aforesaid deficiencies in the prior art, the invention aims to provide a device for deploying and retracting liquid crystal display (LCD) and Control Method Thereof. Apart from ensuring successful deploying and retracing of the LCD when it is playing video files, the device also provides automatic LCD retracting in the event of power outage and unexpected exceptions to ensure use safety.

SCHEME FOR SOLVING THE PROBLEMS

Technical Scheme

For this purpose, the technical scheme for the invention discloses a device for deploying and retracting liquid crystal display (LCD) which comprises a shaft connected to the LCD and a servomechanism which drives the LCD on the shaft to rotate. Wherein, the said servomechanism comprises a gear motor, a one-way bearing dynamically connected to the gear motor, an electromagnetic clutch, a speed reducer, and a plane four-bar linkage mechanism which drives the LCD on the said shaft. The said electromagnetic clutch is also connected to a spring motor which dynamically connects to the speed reducer.

In the deploying and retracing direction of the said LCD, a stowed position transducer and a retracted position transducer are disposed to monitor the LCD position changes and an angle sensor to monitor the LCD deploying speed changes.

The said stowed position transducer, retracted position transducer, angle sensor, gear motor, and electromagnetic clutch are electrically connected to a controller.

The control method of the device for deploying and retracting LCD is characterized in that:

1) For video playing, the controller controls the gear motor to energize the electromagnetic clutch, and the gear motor drives the one-way bearing, the speed reducer which is connected when the electromagnetic clutch is energized, and the plane four-bar linkage mechanism successively so that the LCD deploys; In this process, the stowed position sensor monitors the real-time stowed position and sends signals to the controller when the LCD reaches the pre-defined position; The controller controls the gear motor to deenergize the electromagnetic clutch and end the deploying process; The one-way bearing stops the LCD at the stowed state; The electromagnetic clutch drives the spiral spring in the spring motor to store energy.

2) When video playing is completed or in the event of power outage or unexpected exceptions, the controller controls the electromagnetic clutch to deenergize or the electromagnetic clutch automatically deenergizes so that the electromagnetic clutch is isolated. The spiral spring in the spring motor releases energy and reversely drives the speed reducer and the plane four-bar linkage mechanism successively so that the LCD retracts. When the retracted position sensor detects that the LCD has reached the pre-defined position, it sends signals to the controller which controls the electromagnetic clutch to energize. The one-way bearing stops the LCD at the retracted state.

The invention realizes LCD deploying through the gear motor, electromagnetic clutch, and speed reducer and LCD retracting through the spring motor and speed reducer. The one-way bearing locates the LCD deploying and retracting state. The stowed position sensor, retracted position sensor, and angle sensor monitor the real-time LCD state, and send different signals to the controller which controls the gear motor and electromagnetic clutch to realize LCD deploying or retracting in the event of power outage or unexpected exceptions. The invention features a compact structure and modular design to facilitate installation and maintenance at a high safety and energy efficiency level.

Furthermore, the said device comprises a common-type installation panel with a cavity to horizontally place the LCD and a housing secured on the panel back. The said shafts are mounted on the housing and inside the cavity on the common-type installation panel. The said servomechanism is arranged inside the housing.

A mounting plate is secured on the said common-type installation panel and the two enclose a cavity to place the LCD. The said gear motor, one-way bearing, spring motor, speed reducer, and angle sensor are fixed onto the mounting plate.

The said electromagnetic clutch is one that can adjust the engaging retentivity.

The said spring motor has a damping gear at one end whose damping force is inversely proportional to the number of revolutions.

The said spring motor comprises a fixing plate and a housing secured onto it. A mandrel is disposed on the same shaft in the cavity formed between the housing and fixing plate and wounded on the mandrel is a spiral spring with two ends fixed on the said mandrel and housing. A bearing is disposed at two ends of the said mandrel.

The said spring motor is one that can adjust the initial torque.

The control method of the device in the event of power outage or unexpected exceptions is as follows:

When the LCD experiences impact while playing video by an external force which is stronger than the engaging retentivity of the electromagnetic clutch and causes the electromagnetic clutch to slip, the stowed position sensor collects position change signals of the LCD and sends them to the controller. The controller controls the electromagnetic clutch to deenergize so that the electromagnetic clutch is isolated. The spiral spring in the spring motor releases energy and reversely drives the speed reducer and the plane four-bar linkage mechanism so that the LCD retracts.

When the LCD experiences impact or resistance in the deploying process by an external force, the angle sensor collects LCD speed change signals and sends them to the controller which controls the electromagnetic clutch to deenergize so that the electromagnetic clutch is isolated. The spiral spring in the spring motor releases energy and reversely drives the speed reducer and the plane four-bar linkage mechanism so that the LCD retracts.

By adjusting the starting torque of the spring motor, the device can apply to LCDs of different specifications smaller than or equal to 15 inches. The slip torque of the electromagnetic clutch can be set to an appropriate value to accommodate external forces of different strengths. These two attributes ensure safe use of the LCD in different scenarios.

BENEFICIAL EFFECTS OF THE INVENTION

Beneficial Effects

In summary, the invention features a compact structure and modular design to facilitate installation and maintenance at low energy consumption. The LCDs can be retrieved. The starting torque of the spring motor can be adjusted to suit LCDs of different sizes, so can the slip torque of the electromagnetic clutch to allow for automatic retracting of the LCD under different external forces. These two attributes ensure safe use of the LCD in different scenarios.

BRIEF DESCRIPTION OF DRAWINGS

Description of Drawings

For a clear description of the technical scheme regarding the embodiments or prior art of the invention, the following briefly introduces the accompanying drawings required for describing the embodiments or prior art. Obviously, the following accompanying drawings are only some embodiments of the invention. For ordinary technical personnel in the art, other accompanying drawings can be obtained on the basis of the following ones without contributing creative labor.

Figure 1:
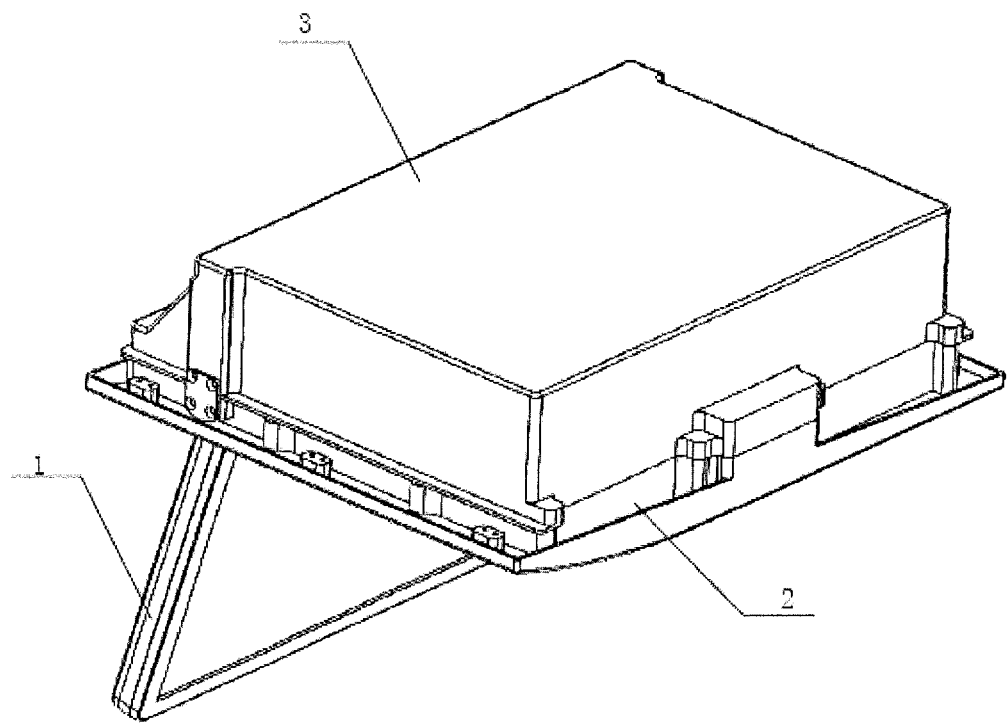

FIG. 1 is an overall schematic diagram of the invention.

Figure 2:
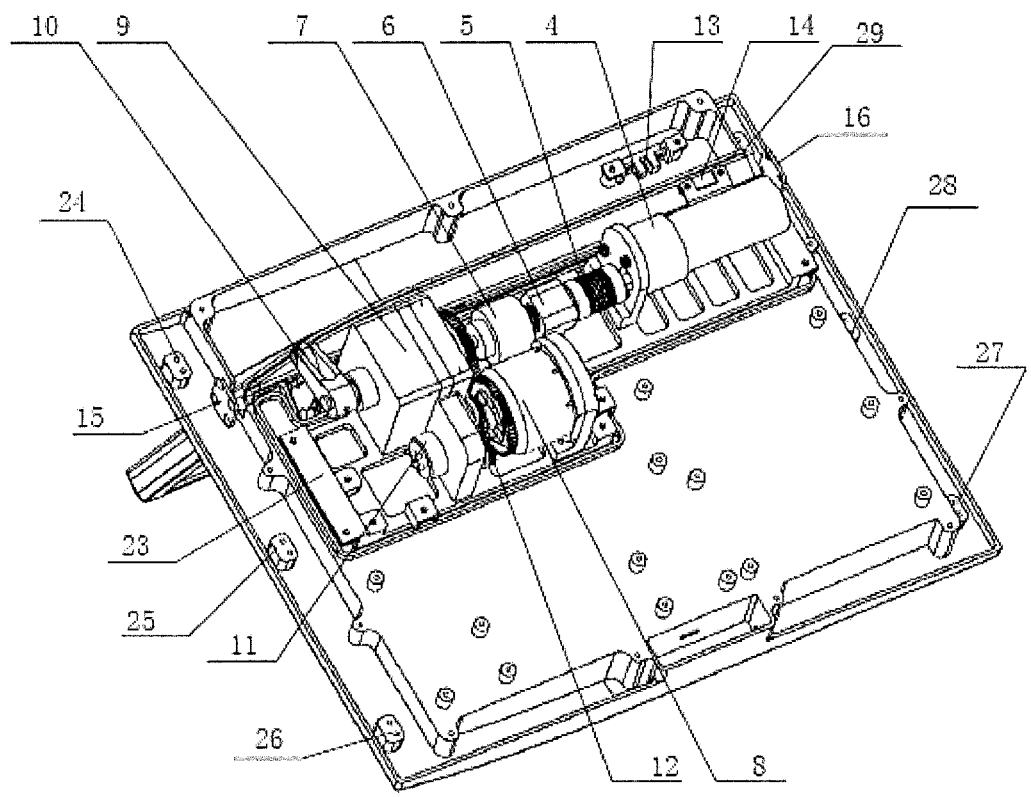

FIG. 2 is a schematic diagram of the internal structure in FIG. 1.

Figure 3:
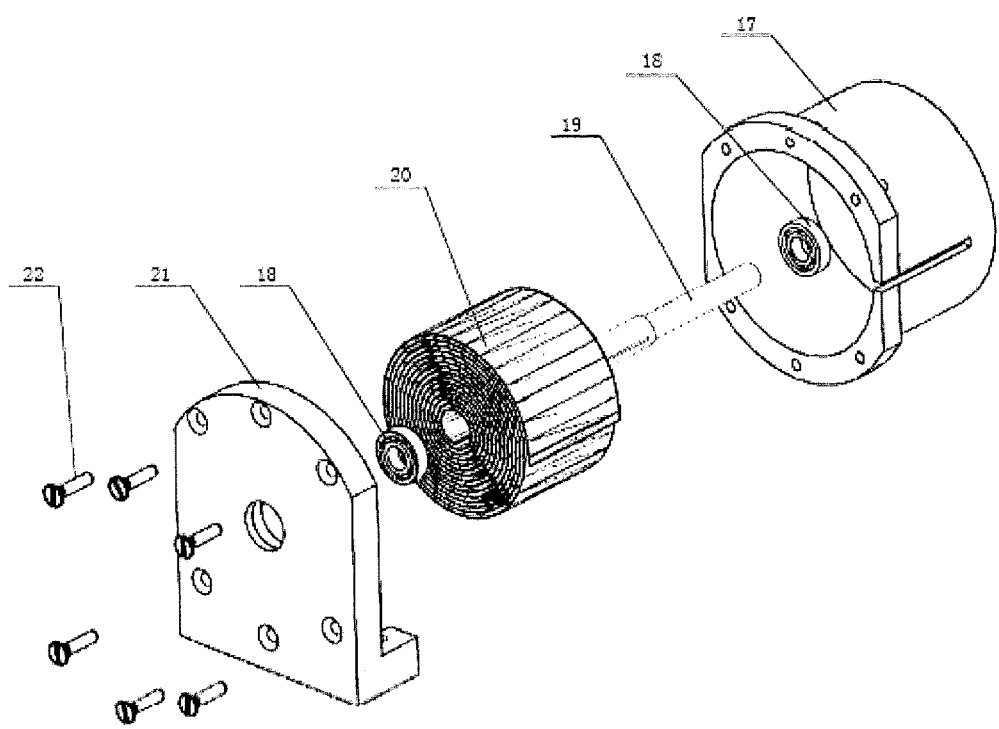

FIG. 3 is a schematic diagram of the structure of the spring motor in FIG. 1.

PREFERRED EMBODIMENTS FOR IMPLEMENTING THE INVENTION

Preferred Embodiments of the Invention

Invention Embodiments

Embodiments of the Invention

The following details the invention based on specific embodiments and accompanying drawings.

FIG. 1 and FIG. 2 show a device for deploying and retracting liquid crystal display (LCD) which comprises shafts (15, 16) connected to the LCD (1) and a servomechanism which drives the LCD (1) on the shafts (15, 16) to rotate. Wherein, the said servomechanism comprises a gear motor (4), a one-way bearing (6) dynamically connected to the gear motor (4), an electromagnetic clutch (7), a speed reducer (9), and a plane four-bar linkage mechanism (10) which drives the LCD on the said shafts (15, 16) to rotate. The said electromagnetic clutch (7) is also connected to a spring motor (8) which dynamically connects to the speed reducer (9). The gear motor (4) and electromagnetic clutch (7) are dynamically connected through a coupler (5).

In the deploying and retracing direction of the said LCD (1), a stowed position transducer (14) and a retracted position transducer (13) are disposed to monitor the LCD (1) position changes and an angle sensor (11) to monitor the LCD (1) deploying speed changes.

The said stowed position transducer (14), retracted position transducer (13), angle sensor (11), gear motor (4), and electromagnetic clutch (7) are electrically connected to a controller.

The controller collects and processes signals generated by the stowed position transducer (14), retracted position transducer (13), and angle sensor (11), and controls the gear motor (4) and electromagnetic clutch (7) to energize or deenergize. The controller may use a microprocessor in the prior art or a programmable logic device with signal collection, processing, and control functions.

The device can fully meet the requirements of the aircraft cabin entertainment system by disposing the device beneath the cabin trunk. When the video player is idle, the LCD (1) is stopped at the retracted state and is aligned with the trunk profile. When the video player is working, the LCD (1) deploys to a certain angle to entertain the passengers or broadcast information. When the LCD (1) encounters an external force when it is deploying or playing video files or in the event of power outage, it can automatically retracts.

Specifically, the said device also comprises a common-type installation panel (2) with a cavity to horizontally place the LCD (1) and a housing (3) secured on the panel back. The said shafts (15, 16) are mounted on the housing (3) and inside the cavity on the common-type installation panel (2). The said servomechanism is arranged inside the housing (3). For appearance concerns, the shape of the common-type installation panel (2) can be changed to suit the trunk and the shape of the common-type installation panel (2) is the same as that of the housing of the LCD (1). The shafts (15, 16) do not necessarily need to be installed on the housing (3). For example, a hole can be made on a wall on the side opposite to the cavity of the common-type installation panel (2) and mount the shafts (15, 16) in this hole to drive the LCD (1) to rotate. Installation of the shafts on the housing (3) is the same as that on the common-type installation panel (2). When the LCD (1) is rotating, fix the shafts (15, 16) onto the common-type installation panel (2) or the housing (3) to connect the LCD (1) with the shafts (15, 16). It may also do to drive the plane four-bar linkage mechanism to directly act on the LCD (1). Pay attention that when the LCD (1) disposed on the shafts (15, 16) is in retracted state, the shape of the housing of the LCD (1) must be the same as that of the common-type installation panel (2). The said common-type installation panel (2) is fixed at the trunk bottom through erection columns (24, 25, 26, 27, 28, 29) and bolt holes.

As shown in FIG. 2, a mounting plate (23) is secured on the said common-type installation panel (2) and the two enclose a cavity to place the LCD (1). The said gear motor (4), one-way bearing (6), spring motor (8), speed reducer (9), and angle sensor (11) are fixed onto the mounting plate (23). This disposal provides a modular design to facilitate processing, manufacturing, installation, and maintenance of the device.

The said electromagnetic clutch (7) is one that can adjust the engaging retentivity, that is, the slip torque of the electromagnetic clutch (7) is adjustable. Specifically, the engaging retentivity between clutch discs of the electromagnetic clutch (7) can be adjusted by adjusting its voltage to accommodate different external forces. In addition, the initial torque of the said spring motor (8) can be adjusted to suit LCDs of different specifications.

As shown in FIG. 3, the said spring motor (8) comprises a fixing plate (21) fixed on the mounting plate (23) and a housing (17) secured onto the fixing plate (21) with a screw (22). A mandrel (19) is disposed on the same shaft in the cavity formed between the housing (17) and fixing plate (21) and wounded on the mandrel (19) is a spiral spring (20) with two ends fixed on the said mandrel (19) and housing (17). A bearing (18) is disposed at two ends of the said mandrel (19). The spiral spring (20) stores and then releases energy so that the LCD (1) retracts. The bearing (18) disposed at two ends of the said mandrel (19) facilitates connection to the fixing plate (21) and the housing (17) and ensures smooth operation of the spring motor (8).

To ensure smooth retracting of the LCD (1), a damping gear (12) whose damping force is inversely proportional to the number of revolutions is disposed at the end of the spring motor (8). With this disposal, when the spring motor (8) drives the. LCD (1) to retract, the starting segment applies a large moment of resistance to the spring motor (8) to prevent damage to the LCD (1) due to excessive speed arising from a substantial release force when the LCD retracts.

The control method of the invention is as follows:

1) For video playing, the controller controls the gear motor (4) to energize the electromagnetic clutch (7), and the gear motor (4) drives the one-way bearing (6), the speed reducer (9) which is connected when the electromagnetic clutch (7) is energized, and the plane four-bar linkage mechanism (10) successively so that the LCD (1) deploys. In this process, the stowed position sensor (14) monitors the real-time stowed position and sends signals to the controller when the LCD (1) reaches the pre-defined position. The controller controls the gear motor (4) to deenergize the electromagnetic clutch (7) and end the deploying process. The one-way bearing (6) stops the LCD (1) at stowed state. The electromagnetic clutch (7) drives the spiral spring (20) in the spring motor (8) to store energy.

2) When video playing is completed or in the event of power outage or unexpected exceptions, the controller controls the electromagnetic clutch (7) to deenergize or the electromagnetic clutch (7) automatically deenergizes so that the electromagnetic clutch (7) is isolated. The spiral spring (20) in the spring motor (8) releases energy and reversely drives the speed reducer (9) and the plane four-bar linkage mechanism (10) successively so that the LCD (1) retracts, When the retracted position sensor (13) detects that the LCD (1) has reached the pre-defined position, it sends signals to the controller which controls the electromagnetic clutch (7) to energize. The one-way bearing (6) stops the LCD (1) at the retracted state.

When the LCD (1) experiences impact while playing video by an external force which is stronger than the engaging retentivity of the electromagnetic clutch (7) and causes the electromagnetic clutch (7) to slip, the stowed position sensor (14) collects position change signals of the LCD (1) and sends them to the controller. The controller controls the electromagnetic clutch (7) to deenergize so that the electromagnetic clutch (7) is isolated. The spiral spring (20) in the spring motor (8) releases energy and reversely drives the speed reducer (9) and the plane four-bar linkage mechanism (10) so that the LCD (1) retracts.

When the LCD (1) experiences impact or resistance in the deploying process by an external force, the angle sensor (11) collects speed change signals of the LCD (1) and sends them to the controller which controls the electromagnetic clutch (7) to deenergize so that the electromagnetic clutch (7) is isolated. The spiral spring (20) in the spring motor (8) releases energy and reversely drives the speed reducer (9) and the plane four-bar linkage mechanism (10) so that the LCD (1) retracts.

Examples are used herein to illustrate the principle and embodiment of the technical scheme regarding the invention. The aforesaid embodiments only apply to help better understand the principle of the embodiments of the invention. Ordinary technical personnel in the art may modify the detailed description of the preferred embodiments and scope of application based on the embodiments of the invention. In summary, the Specifications shall not be interpreted as a limitation upon the invention.

The invention claimed is:

1. A device for deploying and retracting liquid crystal display (LCD), the device comprises:
   shafts connected to the LCD; and
   a servomechanism, which drives the LCD on the shafts to deploy and retract, comprising:
      a gear motor;
      a one-way bearing dynamically connected to a gear motor;
      a speed reducer;
      a plane four-bar linkage mechanism which drives the LCD on the shafts to rotate; and
      an electromagnetic clutch connected to a spring motor which dynamically connects to the speed reducer,
   wherein:
      the spring motor comprises a fixing plate fixed on the mounting plate and a housing secured onto the fixing plate,
      a mandrel is disposed on the same shaft in a cavity formed between the housing and the fixing plate, and wound on the mandrel is a spiral spring with two ends fixed on the mandrel and the housing,
      a bearing is disposed at two ends of the mandrel,
      in the deploying and retracing direction of the said LCD, a stowed position transducer and a retracted position transducer are disposed to monitor the LCD position changes and an angle sensor to monitor the LCD deploying speed changes, and
      the stowed position transducer, retracted position transducer, angle sensor, gear motor, and electromagnetic clutch are electrically connected to a controller.

2. A device for deploying and retracting liquid crystal display (LCD) as claimed in claim 1 wherein:
   the device comprises a common-type installation panel with a cavity to horizontally place the LCD and a housing secured on the panel back;
   the shafts are mounted on the housing and inside the cavity on the common-type installation panel; and
   the servomechanism is arranged inside the housing.

3. A device for deploying and retracting liquid crystal display (LCD) as claimed in claim 2 wherein:

a mounting plate is secured on the common-type installation panel and the two enclose a cavity to place the LCD; and the gear motor, one-way bearing, spring motor, speed reducer, and angle sensor are fixed onto the mounting plate.

4. The control method of any device for deploying and retracting LCD as claimed in claim 3 wherein:
1) for video playing, the controller controls the gear motor to energize the electromagnetic clutch, and the gear motor drives the one-way bearing, the speed reducer which is connected when the electromagnetic clutch is energized, and the plane four-bar linkage mechanism successively so that the LCD deploys; in this process, the stowed position sensor monitors the real-time stowed position and sends signals to the controller when the LCD reaches the pre-defined position; the controller controls the gear motor to deenergize the electromagnetic clutch and end the deploying process; the one-way bearing stops the LCD at the stowed state; and the electromagnetic clutch drives the spiral spring in the spring motor to store energy; and
2) when video playing is completed or in the event of power outage or unexpected exceptions, the controller controls the electromagnetic clutch to deenergize or the electromagnetic clutch automatically deenergizes so that the electromagnetic clutch is isolated; the spiral spring in the spring motor releases energy and reversely drives the speed reducer and the plane four-bar linkage mechanism successively so that the LCD retracts; when the retracted position sensor detects that the LCD has reached the pre-defined position, it sends signals to the controller which controls the electromagnetic clutch to energize; and the one-way bearing stops the LCD at the retracted state.

5. The control method of any device for deploying and retracting LCD as claimed in claim 2 wherein:
1) for video playing, the controller controls the gear motor to energize the electromagnetic clutch, and the gear motor drives the one-way bearing, the speed reducer which is connected when the electromagnetic clutch is energized, and the plane four-bar linkage mechanism successively so that the LCD deploys; in this process, the stowed position sensor monitors the real-time stowed position and sends signals to the controller when the LCD reaches the pre-defined position; the controller controls the gear motor to deenergize the electromagnetic clutch and end the deploying process; the one-way bearing stops the LCD at the stowed state; and the electromagnetic clutch drives the spiral spring in the spring motor to store energy; and
2) when video playing is completed or in the event of power outage or unexpected exceptions, the controller controls the electromagnetic clutch to deenergize or the electromagnetic clutch automatically deenergizes so that the electromagnetic clutch is isolated; the spiral spring in the spring motor releases energy and reversely drives the speed reducer and the plane four-bar linkage mechanism successively so that the LCD retracts; when the retracted position sensor detects that the LCD has reached the pre-defined position, it sends signals to the controller which controls the electromagnetic clutch to energize; and the one-way bearing stops the LCD at the retracted state.

6. A device for deploying and retracting liquid crystal display (LCD) as claimed in claim 1 wherein:

the said electromagnetic clutch is one that can adjust the engaging retentivity.

7. The control method of any device for deploying and retracting LCD as claimed in claim 6 wherein:
1) for video playing, the controller controls the gear motor to energize the electromagnetic clutch, and the gear motor drives the one-way bearing, the speed reducer which is connected when the electromagnetic clutch is energized, and the plane four-bar linkage mechanism successively so that the LCD deploys; in this process, the stowed position sensor monitors the real-time stowed position and sends signals to the controller when the LCD reaches the pre-defined position; the controller controls the gear motor to deenergize the electromagnetic clutch and end the deploying process; the one-way bearing stops the LCD at the stowed state; the electromagnetic clutch drives the spiral spring in the spring motor to store energy; and
2) when video playing is completed or in the event of power outage or unexpected exceptions, the controller controls the electromagnetic clutch to deenergize or the electromagnetic clutch automatically deenergizes so that the electromagnetic clutch is isolated; the spiral spring in the spring motor releases energy and reversely drives the speed reducer and the plane four-bar linkage mechanism successively so that the LCD retracts; when the retracted position sensor detects that the LCD has reached the pre-defined position, it sends signals to the controller which controls the electromagnetic clutch to energize; and the one-way bearing stops the LCD at the retracted state.

8. A device for deploying and retracting liquid crystal display (LCD) as claimed in claim 1 wherein:
the said spring motor has a damping gear at one end whose damping force is inversely proportional to the number of revolutions.

9. The control method of any device for deploying and retracting LCD as claimed in claim 8 wherein:
1) For for video playing, the controller controls the gear motor to energize the electromagnetic clutch, and the gear motor drives the one-way bearing, the speed reducer which is connected when the electromagnetic clutch is energized, and the plane four-bar linkage mechanism successively so that the LCD deploys; in this process, the stowed position sensor monitors the real-time stowed position and sends signals to the controller when the LCD reaches the pre-defined position; the controller controls the gear motor to deenergize the electromagnetic clutch and end the deploying process; the one-way bearing stops the LCD at the stowed state; and the electromagnetic clutch drives the spiral spring in the spring motor to store energy; and
2) when video playing is completed or in the event of power outage or unexpected exceptions, the controller controls the electromagnetic clutch to deenergize or the electromagnetic clutch automatically deenergizes so that the electromagnetic clutch is isolated the spiral spring in the spring motor releases energy and reversely drives the speed reducer and the plane four-bar linkage mechanism successively so that the LCD retracts; when the retracted position sensor detects that the LCD has reached the pre-defined position, it sends signals to the controller which controls the electromagnetic clutchto energize; and the one-way bearing stops the LCD at the retracted state.

10. The control method of any device for deploying and retracting LCD as claimed in claim 1 wherein: 1) for video playing, the controller controls the gear motor to energize the electromagnetic clutch, and the gear motor drives the one-way bearing, the speed reducer which is connected when the electromagnetic dutch is energized, and the plane four-bar linkage mechanism successively so that the LCD deploys; mm this process, the stowed position sensor monitors the real-time stowed position and sends signals to the controller when the LCD reaches the pre-defined position; the controller controls the gear motor to eenergize the electromagnetic dutch and end the deploying process; the one-way bearing stops the LCD at the stowed state; and the electromagnetic dutch drives the spiral spring in the spring motor to store energy; and 2) when video playing is completed or in the event of power outage or unexpected exceptions, the controller controls the electromagnetic clutch to deenergize or the electromagnetic clutch automatically deenergizes so that the electromagnetic clutch is isolated; the spiral spring in the spring motor releases energy and reversely drives the speed reducer and the plane four-bar linkage mechanism successively so that the LCD retracts; when the retracted position sensor detects that the LCD has reached the pre-defined position, it sends signals to the controller which controls the electromagnetic clutch to energize; and the one-way bearing stops the LCD at the retracted state.

11. A device for deploying and retracting liquid crystal display (LCD) as claimed in claim 1 wherein:
the said spring motor is one that can adjust the initial torque.

12. The control method of any device for deploying and retracting LCD as claimed in claim 11 wherein:
1) for video playing, the controller controls the gear motor to energize the electromagnetic clutch, and the gear motor drives the one-way bearing, the speed reducer which is connected when the electromagnetic clutch is energized, and the plane four-bar linkage mechanism successively so that the LCD deploys; in this process, the stowed position sensor monitors the real-time stowed position and sends signals to the controller when the LCD reaches the pre-defined position; the controller controls the gear motor to deenergize the electromagnetic clutch and end the deploying process; the one-way bearing stops the LCD at the stowed state; and the electromagnetic clutch drives the spiral spring in the spring motor to store energy; and
2) when video playing is completed or in the event of power outage or unexpected exceptions, the controller controls the electromagnetic clutch to deenergize or the electromagnetic clutch automatically deenergizes so that the electromagnetic clutch is isolated; the spiral spring in the spring motor releases energy and reversely drives the speed reducer and the plane four-bar linkage mechanism successively so that the LCD retracts; when the retracted position sensor detects that the LCD has reached the pre-defined position, it sends signals to the controller which controls the electromagnetic clutch to energize; and the one-way bearing stops the LCD at the retracted state.

13. The control method of any device for deploying and retracting LCD as claimed in claim 1 wherein:
1) for video playing, the controller controls the gear motor to energize the electromagnetic clutch, and the gear motor drives the one-way bearing, the speed reducer which is connected when the electromagnetic clutch is energized, and the plane four-bar linkage mechanism successively so that the LCD deploys; in this process, the stowed position sensor monitors the real-time stowed position and sends signals to the controller when the LCD reaches the pre-defined position; the controller controls the gear motor to deenergize the electromagnetic clutch and end the deploying process; the one-way bearing stops the LCD at the stowed state; and the electromagnetic clutch drives the spiral spring in the spring motor to store energy; and
2) when video playing is completed or in the event of power outage or unexpected exceptions, the controller controls the electromagnetic clutch to deenergize or the electromagnetic clutch automatically deenergizes so that the electromagnetic clutch is isolated; the spiral spring in the spring motor releases energy and reversely drives the speed reducer and the plane four-bar linkage mechanism successively so that the LCD retracts; when the retracted position sensor detects that the LCD has reached the pre-defined position, it sends signals to the controller which controls the electromagnetic clutch to energize; and the one-way bearing stops the LCD at the retracted state.

14. The control method of the device for deploying and retracting LCD as claimed in claim 13 wherein:
when the LCD experiences impact while playing video by an external force which is stronger than the engaging retentivity of the electromagnetic clutch and causes the electromagnetic clutch to slip, the stowed position sensor collects position change signals of the LCD and sends them to the controller,
the controller controls the electromagnetic clutch to deenergize so that the electromagnetic clutch is isolated, and
the spiral spring in the spring motor releases energy and reversely drives the speed reducer and the plane four-bar linkage mechanism so that the LCD retracts.

15. The control method of the device for deploying and retracting LCD as claimed in claim 13 wherein:
when the LCD experiences impact or resistance in the deploying process by an external force, the controller controls the electromagnetic clutch to deenergize so that the electromagnetic clutch is isolated, and
the spiral spring in the spring motor releases energy and reversely drives the speed reducer and the plane four-bar linkage mechanism so that the LCD retracts.

* * * * *